United States Patent
Jeong

(10) Patent No.: US 11,926,374 B2
(45) Date of Patent: Mar. 12, 2024

(54) TORQUE COMPENSATING DEVICE AND METHOD

(71) Applicant: HL MANDO CORPORATION, Pyeongtaek (KR)

(72) Inventor: Yeong Jin Jeong, Suwon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 246 days.

(21) Appl. No.: 17/569,603

(22) Filed: Jan. 6, 2022

(65) Prior Publication Data

US 2022/0227414 A1 Jul. 21, 2022

(30) Foreign Application Priority Data

Jan. 15, 2021 (KR) .................... 10-2021-0006031

(51) Int. Cl.
*B62D 5/04* (2006.01)
*B62D 15/02* (2006.01)

(52) U.S. Cl.
CPC .......... *B62D 5/0463* (2013.01); *B62D 15/025* (2013.01)

(58) Field of Classification Search
CPC ............................. B62D 5/0463; B62D 15/025
See application file for complete search history.

(56) References Cited

U.S. PATENT DOCUMENTS

| | | | | |
|---|---|---|---|---|
| 2010/0324784 A1* | 12/2010 | Yu | ........................ | B62D 5/0472 701/42 |
| 2016/0280252 A1* | 9/2016 | Tagami | ................ | B62D 5/0421 |
| 2019/0023311 A1* | 1/2019 | Nishimura | ........... | B62D 5/0472 |
| 2019/0389508 A1* | 12/2019 | Varunjikar | ........... | B62D 5/0481 |
| 2020/0086915 A1* | 3/2020 | Abele | .................. | B62D 15/029 |

* cited by examiner

*Primary Examiner* — Zoheb S Imtiaz
(74) *Attorney, Agent, or Firm* — Harvest IP Law, LLP

(57) ABSTRACT

The embodiments of the present disclosure relate to a torque compensating device and method. Specifically, the torque compensating device according to the present disclosure may include a compensation torque amount calculator for calculating a compensation torque amount by performing band pass filtering on a frequency corresponding to a vehicle speed of a host vehicle, an inverse compensation torque generator for generating an inverse compensation torque if it is determined that judder and shimmy of a steering wheel have occurred based on the compensation torque amount, and a controller configured to control the generation of the inverse compensation torque to be stopped by determining to be a temporary kickback if the compensation torque amount is calculated to be less than or equal to a first reference value.

14 Claims, 6 Drawing Sheets

TORQUE COMPENSATING DEVICE AND METHOD

CROSS REFERENCE TO RELATED APPLICATION

This application claims priority from Korean Patent Application No. 10-2021-0006031, filed on Jan. 15, 2021, which is hereby incorporated by reference for all purposes as if fully set forth herein.

TECHNICAL FIELD

An embodiment of the present disclosure relates to a torque compensating device and method for providing inverse compensation torque.

In general, in the case that the driver operates the brake in a braking situation while the vehicle is driving, a judder may occur according to the operation of the brake, and the judder generated according to the operation of the brake is transmitted as vibration of the steering wheel. Here, the judder refers to the generation of vibration and noise since the friction force on the friction surface is not constant in the friction clutch or brake.

A steering wheel shimmy vibration refers to rotational component vibration that is generated in the steering wheel through the transmission path of the suspension system and the steering system due to the imbalance force generated from the wheel/tire acting as an excitation force during vehicle driving.

As the steering wheel vibrates due to judder and shimmy, the driver may feel uncomfortable while driving.

The above-mentioned vibrations of judder and shimmy can be canceled by compensating through an inverse compensation torque, but if judder and shimmy are misdetected, the driver may still feel uncomfortable by the continuously generated inverse compensation torque.

SUMMARY

In this background, embodiments of the present disclosure provide a torque compensating device and method capable of stopping providing inverse compensation torque by determining erroneous detection of judder and shimmy.

In an aspect of the present disclosure, there is provided a torque compensating device including a compensation torque amount calculator for calculating a compensation torque amount by performing band pass filtering on a frequency corresponding to a vehicle speed of a host vehicle, an inverse compensation torque generator for generating an inverse compensation torque if it is determined that judder and shimmy of a steering wheel have occurred based on the compensation torque amount, and a controller configured to control the generation of the inverse compensation torque to be stopped by determining to be a temporary kickback if the compensation torque amount is calculated to be less than or equal to a first reference value.

In another aspect of the present disclosure, there is provided a torque compensating method including calculating a compensation torque amount by performing band pass filtering on a frequency corresponding to a vehicle speed of a host vehicle, generating an inverse compensation torque if it is determined that judder and shimmy of a steering wheel have occurred based on the compensation torque amount, and controlling the generation of the inverse compensation torque to be stopped by determining to be a temporary kickback if the compensation torque amount is calculated to be less than or equal to a first reference value.

According to a torque compensating device and method of embodiments of the present disclosure, it is possible to reduce the erroneous determination of judder and shimmy by re-determining the vibration of the steering wheel through the calculated compensation torque amount. In addition, it is possible to improve the driver's steering feeling by reducing the erroneous determination of judder and shimmy.

DETAILED DESCRIPTION

Figure 1:
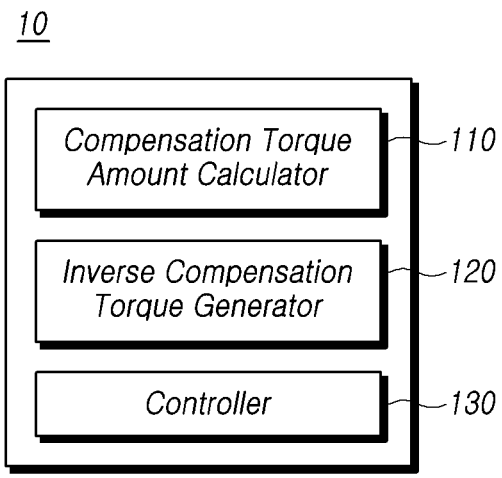
FIG. 1 is a diagram for explaining a torque compensating device according to an embodiment of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described a torque compensating device 10 according to an embodiment of the present disclosure with reference to the accompanying drawings.

FIG. 1 is a diagram for explaining a torque compensating device 10 according to an embodiment of the present disclosure.

The torque compensating device 10 according to an embodiment of the present disclosure may include a compensation torque amount calculator 110, an inverse compensation torque generator 120, a controller 130, and the like.

The torque compensating device 10 according to an embodiment of the present disclosure may be a driver assistance system (DAS) or an advanced driver assistance system (ADAS) which is mounted on a host vehicle to provide information to help the driving of the host vehicle, or to provide assistance to the driver's control of the host vehicle.

Here, ADAS may refer to various types of advanced driver assistance systems, and examples of the driver assistance systems may include, for example, an autonomous emergency braking (AEB) system, a smart parking assistance system (SPAS), a blind spot detection (BSD) system, an adaptive cruise control (ACC) system, a lane departure warning system (LDWS), a lane keeping assist system (LKAS), a lane change assist system (LCAS), and the like. However, the present invention is not limited thereto.

The torque compensating device 10 may be mounted on the host vehicle and may provide or stop the inverse compensation torque through the calculated compensation torque amount by performing band pass filtering on a frequency corresponding to the vehicle speed of the host vehicle.

The torque compensating device 10 may be applied to a manned vehicle and an autonomous vehicle in which a driver rides and controls the host vehicle.

The compensation torque amount calculator 110 may calculate the compensation torque amount by performing band pass filtering on a frequency corresponding to the vehicle speed of the host vehicle.

Specifically, the compensation torque amount calculator 110 may calculate a frequency at which a tire generates from the vehicle speed of the host vehicle, and receive a torque value detected by the vibration of the steering wheel from the torque sensor. Then, in order to calculate a main frequency band corresponding to the vehicle speed of the host vehicle, band pass filtering may be performed on a frequency generated by the tire to calculate a frequency band generated by vibration of the tire.

Here, the main frequency band may vary according to a vehicle model, a tire type, and the like. For example, the smaller the vehicle, the smaller the vehicle wheel size, and thus the rotation speed increases at the same speed, so that a relatively high frequency band can be applied. Accordingly, the compensation torque amount calculator 110 may receive information on the vehicle speed of the host vehicle and a torque value of the steering wheel from the vehicle speed sensor and the torque sensor, respectively.

The torque value detected by the torque sensor may include a torque value generated according to a steering intention of a vehicle driver and a torque value generated due to a brake judder in a braking situation of the vehicle, and may be calculated by filtering the torque value input from the torque sensor through the band pass filter and extracting only the torque value component generated by the vibration of the steering wheel.

In addition, the compensation torque calculator may calculate the compensation torque amount at a predetermined vehicle speed. For example, since the judder state occurs when the host vehicle travels at a constant speed, the vehicle speed may be checked as a condition for determining whether the vibration of the steering wheel is caused by the judder state.

In summary, if the brake is operated at the vehicle speed of the host vehicle at a predetermined speed, the vibration of the steering wheel due to the judder can be detected. Accordingly, if the vehicle speed received from the vehicle speed sensor is a predetermined speed and the brake is in operation, the inverse compensation torque generator 120 may determine whether the judder state is present based on the compensation torque amount calculated by band pass filtering.

Figure 2:
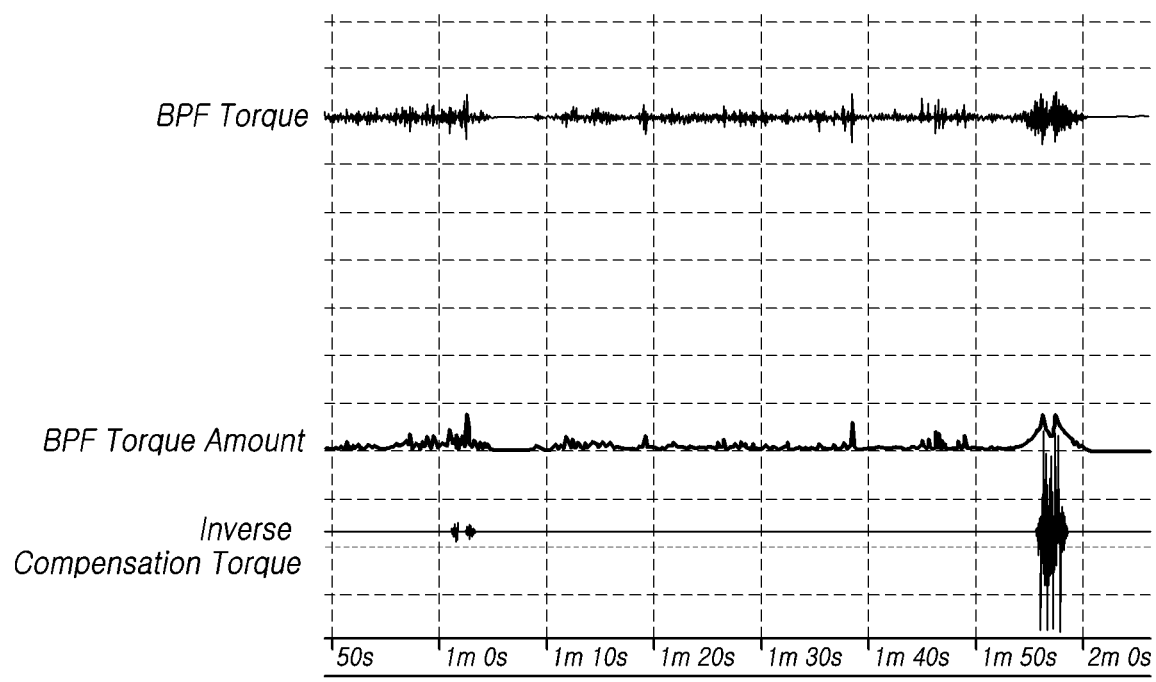
FIG. 2 is a diagram schematically illustrating generation of an inverse compensation torque based on a compensation torque amount according to an embodiment.

FIG. 2 is a diagram schematically illustrating generation of an inverse compensation torque based on a compensation torque amount according to an embodiment.

Referring to FIG. 2, if it is determined that judder and shimmy of the steering wheel have occurred based on the compensation torque amount, the inverse compensation torque generator 120 may generate the inverse compensation torque.

A frequency corresponding to the vehicle speed of the host vehicle may be calculated in a main frequency band through the band pass filter, and BPF torque, that is, the compensation torque, may be calculated in the corresponding main frequency band as shown in FIG. 2. The compensation torque amount may be the amount of BPF torque as shown in FIG. 2.

In an embodiment, the inverse compensation torque generator 120 may determine that the steering wheel is in a judder or shimmy state if the compensation torque amount is calculated to be greater than or equal to the preset torque amount at the preset number of times or more during the preset period, and may generate the inverse compensation torque in response to the calculated compensation torque amount. The above-mentioned criterion may be set to avoid erroneously determining as a judder or shimmy state, despite a temporary kickback caused by disturbances such as unevenness of the road surface in the case that the compensation torque amount is temporarily calculated over the preset torque amount.

Figure 3:
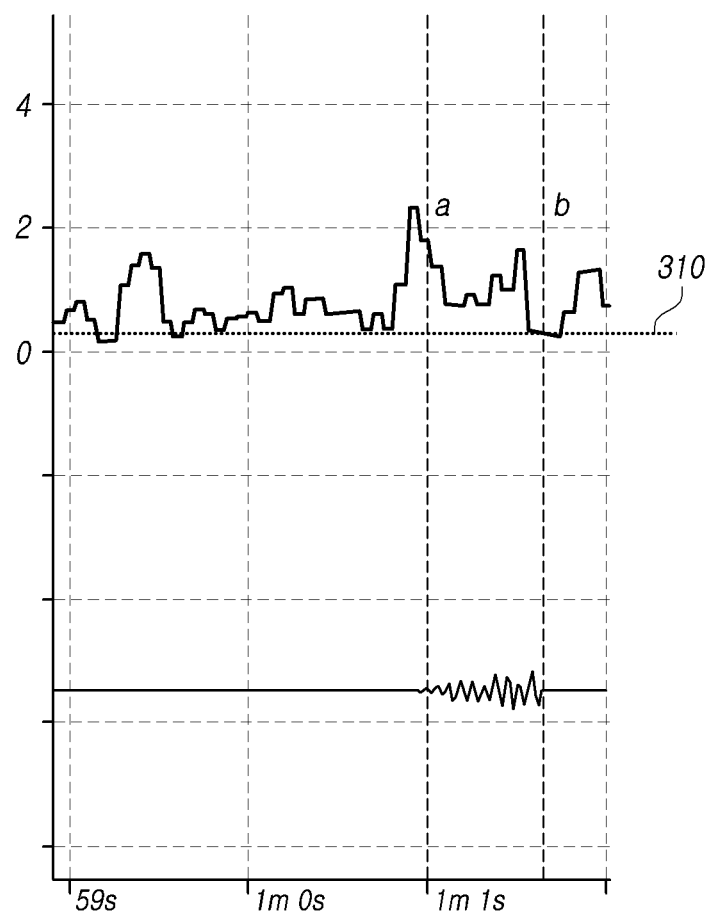
FIG. 3 is a diagram for explaining the stop of the generation of the inverse compensation torque according to an embodiment.

FIG. 3 is a diagram for explaining the stop of the generation of the inverse compensation torque according to an embodiment.

Referring to FIG. 3, if the compensation torque amount is calculated to be less than or equal to a first reference value 310, the controller 130 may determine that it is a temporary kickback and control to stop the generation of the inverse compensation torque.

Specifically, the inverse compensation torque generator 120 may generate the inverse compensation torque corresponding to the compensation torque amount by determining the judder or shimmy state in FIG. 3 (see a) through the above-described criteria. In addition, if the continuously calculated compensation torque amount is calculated to be less than or equal to the first reference value 310 in FIG. 3 (see b), the controller 130 may determine that the current vibration of the steering wheel is a kickback state rather than a judder or shimmy state, and may generate a control signal for controlling the inverse compensation torque generator 120 to stop the generation of the inverse compensation torque.

The inverse compensation torque that has been stopped in this way can be regenerated if the steering wheel continues to vibrate, and the calculated compensation torque amount satisfies the criteria for generating the above-mentioned inverse compensation torque.

Figure 4:
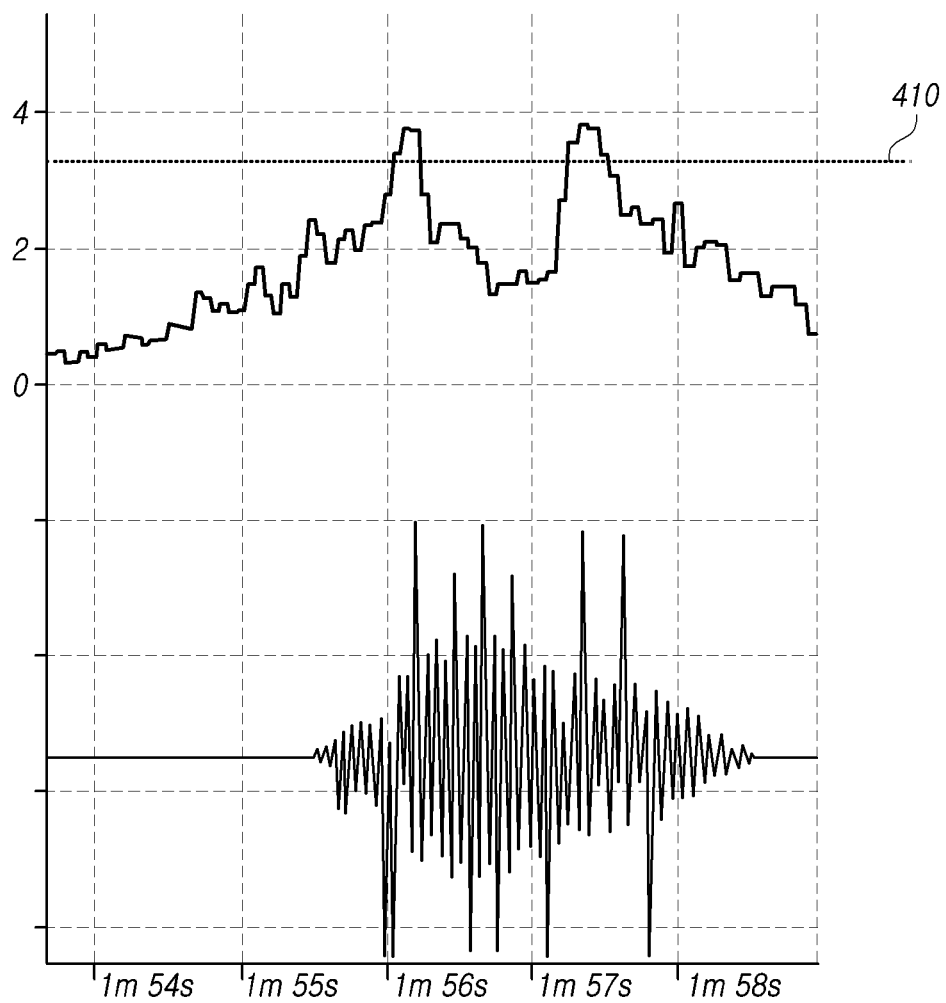
FIG. 4 is a diagram for explaining the maintenance of the generation of the inverse compensation torque according to an embodiment.

FIG. 4 is a diagram for explaining the maintenance of the generation of the inverse compensation torque according to an embodiment.

Referring to FIG. 4, if the compensation torque amount is calculated to be equal to or greater than a second reference value 410, the controller 130 may control to maintain the generation of the inverse compensation torque.

Specifically, if the inverse compensation torque is generated and the compensation torque amount is calculated to be equal to or greater than the second reference value 410, the controller 130 determines that the judder and shimmy states rather than the temporary kickback caused by disturbance of the host vehicle. Accordingly, the controller 130 may generate a control signal so that the inverse compensation torque generator 120 continuously generates the inverse compensation torque.

In one embodiment, the controller 130 may control to maintain the generation of the inverse compensation torque if the compensation torque amount is calculated to be equal to or less than the first reference value 310 after the compensation torque amount is calculated to be greater than or equal to the second reference value 410.

Specifically, if the compensation torque amount is calculated to be equal to or greater than the second reference value 410, the controller 130 has determined that the current steering vibration is not a kickback but a judder and shimmy state. In addition, the compensation torque amount may be calculated to be low over time due to generation of the inverse compensation torque corresponding to the compensation torque amount equal to or greater than the second reference value 410 or the deceleration of the host vehicle due to judder. Accordingly, even if the compensation torque amount is calculated below the first reference value 310, since the compensation torque amount is calculated to be low, so that the generation of the inverse compensation torque may be gradually reduced, the generation of the inverse compensation torque may be maintained even if the compensation torque amount is calculated to be less than the first reference value 310.

Conversely, if the compensation torque amount is calculated to be less than or equal to the first reference value 310 before the compensation torque amount is calculated to be greater than or equal to the second reference value 410, the controller 130 may determine that the vibration of the steering wheel is a kickback, and may control to stop the generation of the inverse compensation torque.

In an embodiment, if the compensation torque amount is calculated to be equal to or greater than the second reference value 410 for a predetermined time, the controller 130 may control to maintain the generation of the inverse compensation torque. If the compensation torque amount is calculated in an insufficient vibration generation section, for example, in a section such as less than the second reference value 410 and greater than or equal to the first reference value 310, the controller 130 may determine that the judder and shimmy states do not exist. However, in this case, since the compensation torque amount is not calculated below the first reference value 310, the controller 130 may control to maintain the generation of the inverse compensation torque for a predetermined time and then stop the generation of the inverse compensation torque.

As described above, the torque compensating device of the present disclosure may reduce the erroneous determination of judder and shimmy by re-determining the vibration of the steering wheel through the calculated compensation torque amount. In addition, it is possible to improve the driver's steering feeling by reducing the erroneous determination of the judder and shimmy.

The torque compensating device 10 may be implemented as an electronic control unit (ECU), a microcomputer, or the like.

In an embodiment, a computer system (not shown) such as the torque compensating device 10 may be implemented as an electronic control unit (ECU). The electronic control unit may include at least one element of one or more processors, memories, storage, user interface inputs and user interface outputs, which may communicate with each other via a bus. Furthermore, the electronic control unit may also comprise a network interface for connecting to the network. The processor may be a CPU or a semiconductor device that executes processing instructions stored in memory and/or storage. Memory and storage may include various types of volatile/non-volatile storage media. For example, memory may include ROM and RAM.

Hereinafter, it will be described a torque compensating method using the torque compensating device 10 that can perform all of the above-described present disclosure.

Figure 5:
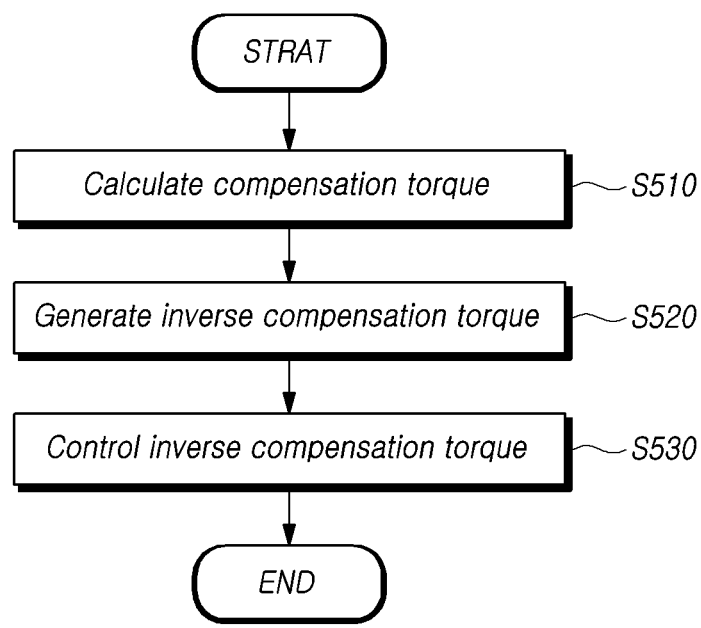
FIG. 5 is a flowchart illustrating a torque compensation method according to an embodiment of the present disclosure.

FIG. 5 is a flowchart illustrating a torque compensation method according to an embodiment of the present disclosure.

Referring to FIG. 5, a torque compensating method according to the present disclosure may include calculating a compensation torque amount by performing band pass filtering on a frequency corresponding to a vehicle speed of a host vehicle (S510), generating an inverse compensation torque if it is determined that judder and shimmy of a steering wheel have occurred based on the compensation torque amount (S520), and controlling the generation of the inverse compensation torque to be stopped by determining to be a temporary kickback if the compensation torque amount is calculated to be less than or equal to a first reference value (S530).

In calculating the compensation torque amount (S510), the compensation torque amount may be calculated at a predetermined vehicle speed.

Figure 6:
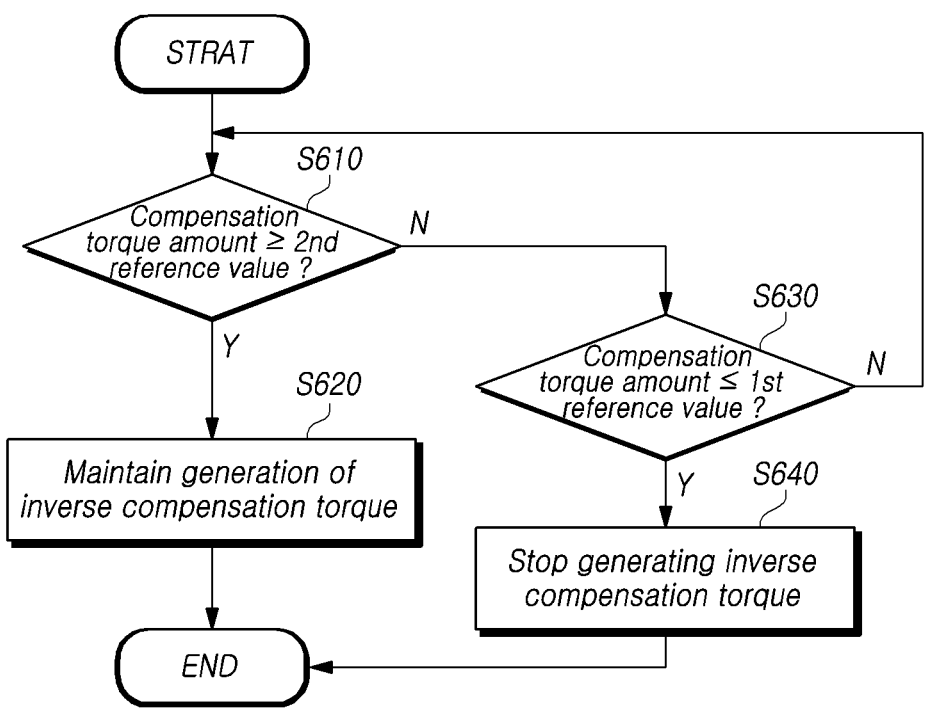
FIG. 6 is a flowchart for specifically explaining step S530 according to an embodiment.

FIG. 6 is a flowchart for specifically explaining step S530 according to an embodiment.

Referring to FIG. 6, the torque compensating device may determine whether the calculated amount of compensation torque is equal to or greater than a second reference value 410 (S610).

If the compensation torque amount is equal to or greater than the second reference value 410 (Yes in S610), the torque compensating device 10 may maintain the previous control situation and control to continuously generate the inverse compensation torque (S620). In addition, if the compensation torque amount is equal to or greater than the second reference value 410 and the calculated compensation torque amount is less than or equal to a first reference value 310, the torque compensating device 10 may maintain the previous control situation to continuously generate the inverse compensation torque.

If the compensation torque amount is less than the second reference value 410 (No in S610), the torque compensating device 10 may determine whether the calculated compensation torque amount is less than or equal to the first reference value 310 (S630).

If the compensation torque amount is less than or equal to the first reference value 310 (Yes in S630), the torque compensating device 10 may control to stop the generation of the inverse compensation torque (S640).

As described above, according to the present disclosure, the torque compensating device 10 and method can reduce the erroneous determination of the judder and the shimmy by re-determining the vibration of the steering wheel through the compensation torque.

If the compensation torque amount exceeds the first reference value (No in S630), the torque compensating device may determine whether the compensation torque amount calculated later is equal to or greater than the second reference value. In one embodiment, the torque compensating device may generate the inverse compensation torque for a predetermined time and then stop the generation of the inverse compensation torque.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A torque compensating device comprising:
   a compensation torque amount calculator for calculating a compensation torque amount by performing band pass filtering on a frequency corresponding to a vehicle speed of a host vehicle;
   an inverse compensation torque generator for generating an inverse compensation torque if it is determined that judder and shimmy of a steering wheel have occurred based on the compensation torque amount; and
   a controller configured to control the generation of the inverse compensation torque to be stopped by determining to be a temporary kickback if the compensation torque amount is calculated to be less than or equal to a first reference value,
   wherein the controller controls to maintain the generation of the inverse compensation torque if the compensation torque amount is calculated to be greater than or equal to a second reference value,
   wherein the controller controls to maintain the generation of the inverse compensation torque if the compensation torque amount is calculated to be equal to or less than the first reference value after being calculated to be greater than or equal to the second reference value.

2. The torque compensating device of claim 1, wherein the controller controls to stop the generation of the inverse compensation torque if the compensation torque amount is calculated to be equal to or less than the first reference value before being calculated to be greater than or equal to a second reference value.

3. The torque compensating device of claim 1, wherein the inverse compensation torque generator generates the inverse compensation torque larger as the calculated compensation torque amount increases.

4. The torque compensating device of claim 1, wherein the compensation torque amount calculator calculates the compensation torque amount at a predetermined vehicle speed, and the controller controls to maintain the generation of the inverse compensation torque if the compensation torque amount is calculated to be equal to or greater than the second reference value for a predetermined time.

5. A torque compensating method comprising:
   calculating a compensation torque amount by performing band pass filtering on a frequency corresponding to a vehicle speed of a host vehicle;
   generating an inverse compensation torque if it is determined that judder and shimmy of a steering wheel have occurred based on the compensation torque amount; and
   controlling the generation of the inverse compensation torque to be stopped by determining to be a temporary kickback if the compensation torque amount is calculated to be less than or equal to a first reference value,
   wherein controlling the generation of the inverse compensation torque comprises controlling to maintain the generation of the inverse compensation torque if the compensation torque amount is calculated to be greater than or equal to a second reference value,
   wherein controlling the generation of the inverse compensation torque comprises controlling to maintain the generation of the inverse compensation torque if the compensation torque amount is calculated to be equal to or less than the first reference value after being calculated to be greater than or equal to the second reference value.

6. The torque compensating method of claim 5, wherein controlling the generation of the inverse compensation torque comprises controlling to stop the generation of the inverse compensation torque if the compensation torque amount is calculated to be equal to or less than the first reference value before being calculated to be greater than or equal to a second reference value.

7. The torque compensating method of claim 5, wherein generating an inverse compensation torque comprises generating the inverse compensation torque larger as the calculated compensation torque amount increases.

8. The torque compensating method of claim 5, wherein calculating a compensation torque amount comprises calculating the compensation torque amount at a predetermined vehicle speed, and controlling the generation of the inverse compensation torque comprises controlling to maintain the generation of the inverse compensation torque if the compensation torque amount is calculated to be equal to or greater than the second reference value for a predetermined time.

9. The torque compensating device of claim 1, wherein the inverse compensation torque generator generates the inverse compensation torque if the compensation torque amount is calculated to be greater than or equal to a preset torque amount more than a preset number of times during a preset period.

10. The torque compensating device of claim 1, wherein the band pass filtering is performed on the frequency generated by a tire of the host vehicle.

11. The torque compensating device of claim 1, wherein the controller controls to maintain the generation of the inverse compensation torque for a predetermined time and then stop the generation of the inverse compensation torque if the compensation torque amount is greater than or equal to the first reference value and less than the second reference value.

12. The torque compensating method of claim 5, wherein generating the inverse compensation torque comprises generating the inverse compensation torque if the compensation torque amount is calculated to be greater than or equal to a preset torque amount more than a preset number of times during a preset period.

13. The torque compensating method of claim 5, wherein the band pass filtering is performed on the frequency generated by a tire of the host vehicle.

14. The torque compensating method of claim 5, wherein controlling the generation of the inverse compensation torque comprises controlling to maintain the generation of the inverse compensation torque for a predetermined time and then to stop the generation of the inverse compensation torque if the compensation torque amount is greater than or equal to the first reference value and less than the second reference value.

* * * * *